US012047459B1

(12) United States Patent
Michel

(10) Patent No.: US 12,047,459 B1
(45) Date of Patent: Jul. 23, 2024

(54) TUNNELING A FIRST PROTOCOL COMMUNICATION MESSAGE THROUGH A SECOND PROTOCOL COMMUNICATION CHANNEL

(71) Applicant: Dell Products L.P., Round Rock, TX (US)

(72) Inventor: Ruben Michel, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/143,632

(22) Filed: May 5, 2023

(51) Int. Cl.
*H04L 67/142* (2022.01)
*H04L 5/16* (2006.01)
*H04L 67/147* (2022.01)
*H04L 69/18* (2022.01)

(52) U.S. Cl.
CPC .............. *H04L 67/142* (2013.01); *H04L 5/16* (2013.01); *H04L 67/147* (2013.01); *H04L 69/18* (2013.01)

(58) Field of Classification Search
None
See application file for complete search history.

(56) References Cited

U.S. PATENT DOCUMENTS

| | | | | |
|---|---|---|---|---|
| 5,935,212 A * | 8/1999 | Kalajan | ................. | H04L 69/169 709/228 |
| 8,316,237 B1 * | 11/2012 | Felsher | ................. | H04L 63/061 380/282 |
| 9,712,289 B2 * | 7/2017 | Jorgensen | ................. | H04L 9/40 |
| 2004/0022237 A1 * | 2/2004 | Elliott | ................. | H04M 7/1245 370/356 |
| 2004/0068572 A1 * | 4/2004 | Wu | ......................... | H04L 67/02 709/229 |
| 2005/0198380 A1 * | 9/2005 | Panasyuk | ............ | H04L 63/0272 709/239 |
| 2011/0276702 A1 * | 11/2011 | Marchev | ................. | H04L 69/32 709/228 |
| 2012/0196571 A1 * | 8/2012 | Grkov | ..................... | G06F 3/165 455/411 |
| 2012/0246202 A1 * | 9/2012 | Surtani | ................. | G06F 16/289 707/812 |
| 2015/0271271 A1 * | 9/2015 | Bullotta | ................. | H04L 67/141 709/228 |

(Continued)

FOREIGN PATENT DOCUMENTS

WO      WO-2023154074 A1  *  8/2023

*Primary Examiner* — Phyllis A Book
(74) *Attorney, Agent, or Firm* — Krishnendu Gupta; Nikhil Patel

(57) ABSTRACT

One or more aspects of the present disclosure relate to tunneling messages corresponding to a first protocol through a second protocol. In embodiments, a communication engine can be provided to a client. The communication engine can intercept a first communication message directed to a server on a client. For example, the first communication message can correspond to the first protocol. Additionally, the first communication message can be converted into a second communication message corresponding to a second protocol. Further, a persistent second protocol communication session can be initiated between the client and server by transmitting the second protocol message. In embodiments, the first protocol can correspond to a Hypertext Transfer Protocol Secure (HTTPS), and the second protocol can correspond to a WebSocket protocol.

10 Claims, 4 Drawing Sheets

(56) References Cited

U.S. PATENT DOCUMENTS

| | | | |
|---|---|---|---|
| 2016/0092254 A1* | 3/2016 | Borra | G06Q 20/085 |
| | | | 718/1 |
| 2020/0366563 A1* | 11/2020 | Patil | G06N 20/00 |
| 2020/0389469 A1* | 12/2020 | Litichever | H04W 4/40 |
| 2022/0006749 A1* | 1/2022 | Momchilov | H04L 69/14 |
| 2023/0208943 A1* | 6/2023 | VanAntwerp | G06F 11/3604 |
| | | | 709/230 |

\* cited by examiner

TUNNELING A FIRST PROTOCOL COMMUNICATION MESSAGE THROUGH A SECOND PROTOCOL COMMUNICATION CHANNEL

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to tunneling messages corresponding to a first protocol through a communication channel corresponding to a second protocol. In embodiments, a communication engine can be provided to a client. The communication engine can intercept a first communication message directed to a server on a client. For example, the first communication message can correspond to the first protocol. Additionally, the first communication message can be converted into a second communication message corresponding to a second protocol. Further, transmitting the second protocol message can initiate a persistent second protocol communication session between the client and server.

In embodiments, the first protocol can include a request-response protocol configured for half-duplex and stateless messaging between the client and server. For example, the first protocol can correspond to a Hypertext Transfer Protocol Secure (HTTPS).

In embodiments, the second protocol can include a fire-and-forget protocol configured for full-duplex and stateful messaging between the client and server. For example, the second protocol can correspond to a WebSocket protocol.

In embodiments, the second communication message can be provided with first protocol metadata from the first communication message.

In embodiments, the metadata can include one or more of a route, expiration timeout, and one or more first protocol commands.

In embodiments, a first protocol network address scheme of the first communication message can be converted into a second protocol network address scheme.

In embodiments, the persistent second protocol communication session can be established in response to receiving the second communication message at the server.

In embodiments, the first protocol metadata can be extracted from the second communication message. Further, the second communication message can be processed according to the first protocol using the first protocol metadata on the server.

In embodiments, a second protocol response can be delivered to the client via the persistent second protocol communication session. For example, the second protocol response can include a success or error message required by the first protocol.

In embodiments, the second protocol response can be resolved according to at least one request-response requirement of the first protocol using the communication engine.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

In addition, business employees can access services of a storage array using a business application (e.g., a client-server application) hosted on a client machine. Often the business application can be a long-running application that accesses the storage array's services via a server using a half-duplex stateless request-response protocol (e.g., a hypertext transfer protocol (HTTP) or HTTP secure (HTTPS)). In such circumstances, only the business application can initiate a communication session with the storage array (via, e.g., a server).

Further, the business application can require real-time or near real-time status information of the storage array. Because a request-response protocol is a stateless half-duplex protocol, the business application must poll the storage array every few seconds for status information. However, such polling techniques require complex communication session management and fragile token-based security resulting in inefficient uses of communication bandwidth and client/server resources (e.g., memory, processor, software, and hardware).

Advantageously, embodiments of the present disclosure can tunnel communication messages corresponding to a first protocol through a communication channel corresponding to a second protocol. For example, on the client machine, the embodiments can intercept request-response protocol messages issued by the business application. Additionally, the embodiments can convert the request-response protocol messages into fire-and-forget protocol messages. Further, the embodiments can initiate a persistent fire-and-forget communication session with the server or storage array from the client machine. Furthermore, the embodiments can process fire-and-forget protocol messages according to request-response protocol requirements described in greater detail herein.

Figure 1:
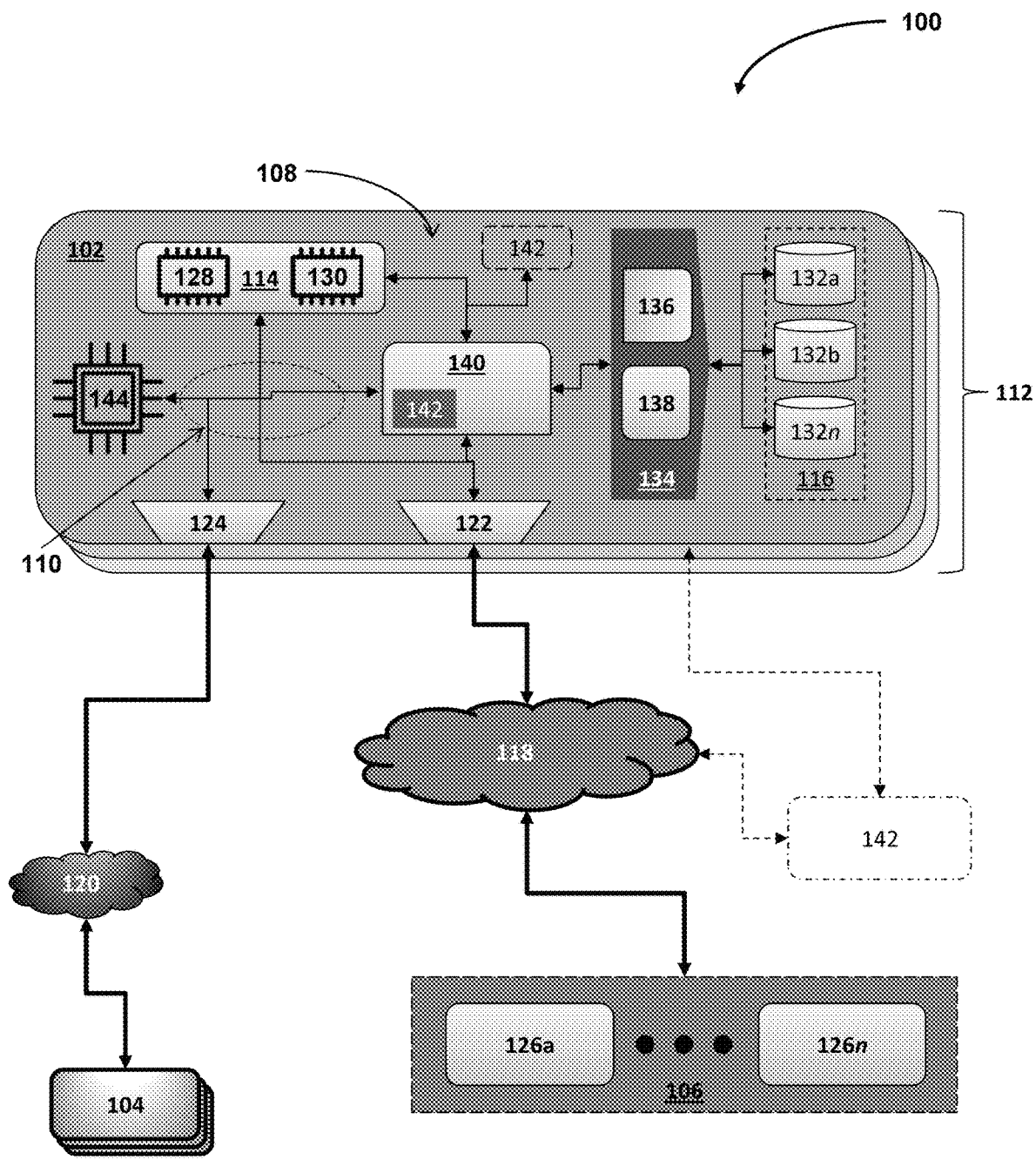
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the 10 messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache 10 messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), and the like. Further, the controller 142 can include logic/circuitry that performs one or more storage-related services. For example, the controller 142 can have an architecture designed to manage the storage array's computing, processing, storage, and memory resources as described in greater detail herein.

Figure 2:
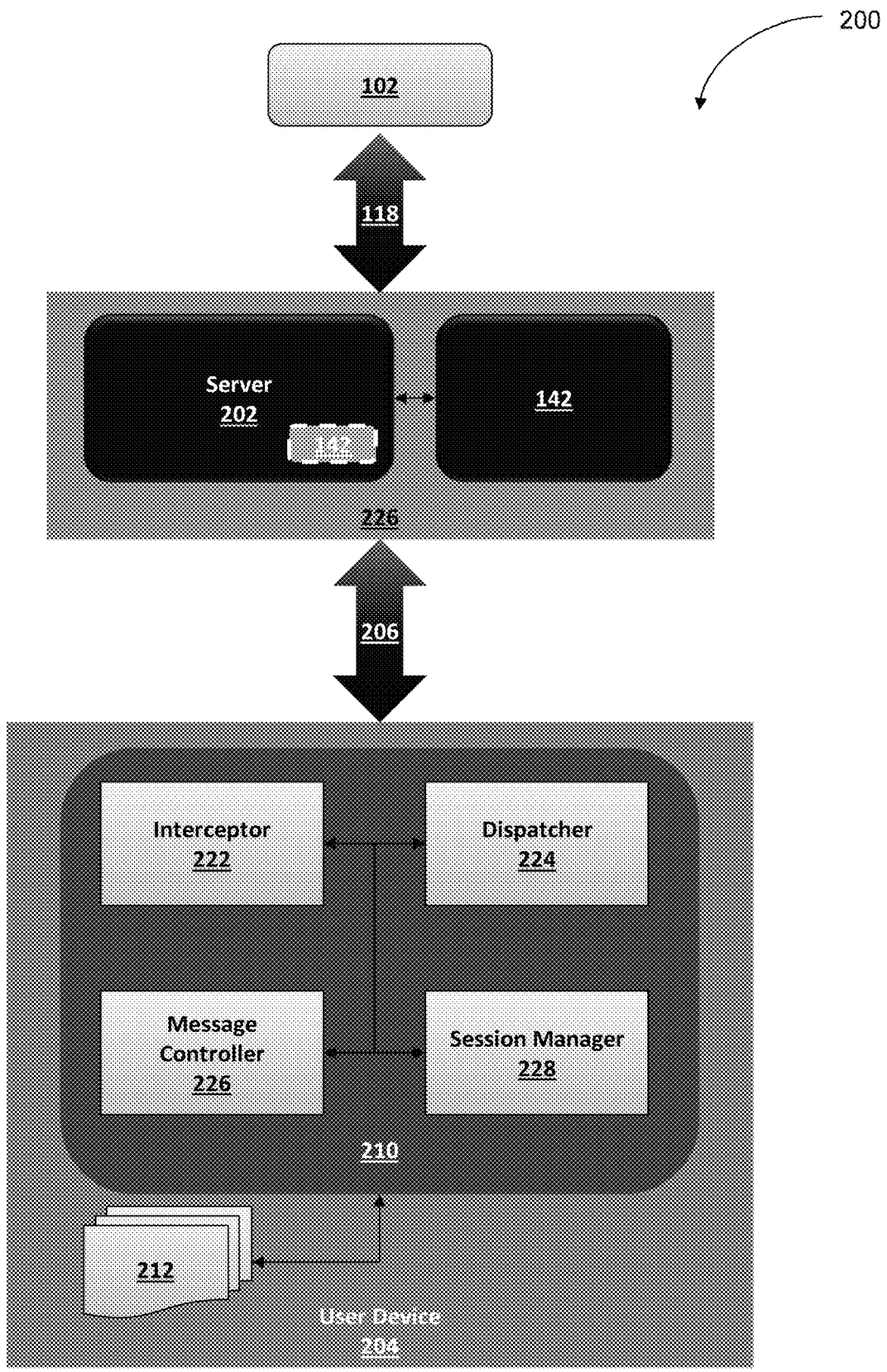
FIG. 2 is a block diagram of a communication engine in accordance with embodiments of the present disclosure.

Regarding FIG. 2, a network environment can include a user device 204, a host machine 226 substantially similar to client machines 126a-n, and a storage array 102. In embodiments, the user device 204 can include one or more applications 212 that can access services provided by a server 202 hosted on the host machine 226. For example, the user device 204 can access the server 202 via a network (e.g., the Internet) 206. Additionally, the server 202 can provide distributed storage services using the storage array 102 via, e.g., a storage area network (SAN) 118.

In embodiments, the applications 226 can include frontend business applications. For example, a frontend application includes applications like a browser that users of the user device 204 interact with to access backend services (e.g., distributed storage services) provided by the server 202. Further, a frontend application can have a configuration that uses a first network protocol to communicate with the server 202. The first network protocol can also include a request-response protocol that provides stateless half-duplex communications between networked devices (e.g., the user device 204 and host machine 226). For example, the request-response protocol can include a Hypertext Transfer Protocol Secure (HTTPS), amongst others.

Further, a business application 212 can require real-time stateful information corresponding to the storage array 102. However, the server 202 cannot initiate and send updated status information corresponding to the storage array 102 because the first protocol is a stateless half-duplex request-response protocol. Accordingly, current naïve approaches require business applications 212 to frequently poll server 202 for updated status information.

In embodiments, the host machine 226 or the server 202 can include a controller (e.g., a communications manager) 142. The controller 142 can enable communications between the business application 212 and the server 202 using a second protocol. Additionally, the second protocol can include a fire-and-forget protocol that provides full-duplex and stateful communications between networked devices. For example, the fire-and-forget protocol can include a WebSocket protocol (WS).

In embodiments, the server 202 can receive an initial request from the business application 212 to establish a communication session via the first protocol. In response to the initial request, the server 202 can provide the user device 204 or the business application 212 with a communication engine 210. Additionally, the server 202 can provide a ready response to the business application 212.

In embodiments, the communication engine 210 can include an interceptor 222 that intercepts message transmissions having a first protocol format from the user device 204 or the business applications 212. For example, the communication engine 210 can listen to network ports (not shown) of the user device 204 for communication messages. Upon detecting a communication message, the interceptor 222 can parse a message's metadata to identify its corresponding protocol format.

In embodiments, the interceptor 222 can intercept a first message corresponding to the first protocol sent by the business application 212. Upon intercepting the first message, the interceptor 222 can convert it into a second message corresponding to the second protocol. For example, the interceptor 222 can extract first protocol metadata and commands from the first message. Additionally, the interceptor 222 can wrap the extracted first protocol metadata and commands in the second message.

Suppose, for example, the first protocol is HTTPS. Then, the interceptor 222 can wrap extracted HTTPS metadata like route (e.g., offset URL), expiration timeout, and the like in the second message. Additionally, the interceptor can wrap extract HTTPS commands like POST, GET, PUT, PATCH, DELETE, and the like in the second message. Further, the interceptor 222 can convert a first protocol network address scheme of the first message into a second protocol network address scheme for the second message. Suppose, for example, the first protocol is HTTPS, and the second is WS. Then, the interceptor 222 can convert an "https:// . . . " address into a "ws:// . . . " or "wss:// . . . " address.

In embodiments, the communication engine 210 can also include a dispatcher 224 that receives or retrieves the second message from the interceptor 222. Further, the dispatcher 224 can transmit the second message to the server 202 using the second protocol. Suppose, for example, the first protocol is HTTPS, and the second is WS. Then, the dispatcher 224 can send the second message using a second protocol communication channel. Suppose, for example, the first protocol is HTTPS. Then, the dispatcher 224 can notify the message controller 226 or a session manager 228 to expect a second protocol message that includes a response to the first message expected by the first protocol.

In embodiments, the server 202 can receive the second message from the user device 204. In response to receiving the second message, the server 202 can establish a persistent communication session using the second protocol, as described in greater detail by the description of FIG. 3 below. For example, the server 202 can extract the wrapped first protocol metadata and commands from the second message. Then, using the first protocol metadata and commands, the server 202 can process the second message according to the first protocol and deliver a response message, including success, error, or other responses required by the first protocol, to the user device 204.

In embodiments, the communication engine 210 can include a message controller 226 that receives the response message from the server 202. Suppose, for example, the second protocol is WS. Then, the message controller 226 can listen for messages sent by the server 202 using the second protocol. In response to detecting a message (e.g., the response message), the message controller 226 determines if the message corresponds to a first protocol message (e.g., the first message). For example, the message controller 226 can determine whether a message includes metadata corresponding to the first protocol. If the message controller 226 detects such metadata, it can initiate a message resolution process. For example, the message controller 226 can pass (e.g., fire) the message to a session manager 228. Additionally, the message controller 226 can determine if the message corresponds to the first message using the notification received from the dispatcher 224.

In embodiments, the communication engine 210 can include a session manager 228 that resolves messages corresponding to the second protocol received from the server 202. Specifically, the session manager 228 can receive a message (e.g., the response message) from the message controller 226. In response to receiving the message, the session manager 228 can resolve the message according to one or more requirements corresponding to the first protocol. Suppose, for example, the first protocol is HTTPS, the second protocol WS, and a message is a second protocol message including a response to a first protocol message (e.g., the response message). Then, the session manager 228 can extract commands corresponding to the first protocol from the message. Further, the session manager 228 resolves any request-response requirements of the first protocol using the extracted commands.

Figure 3:
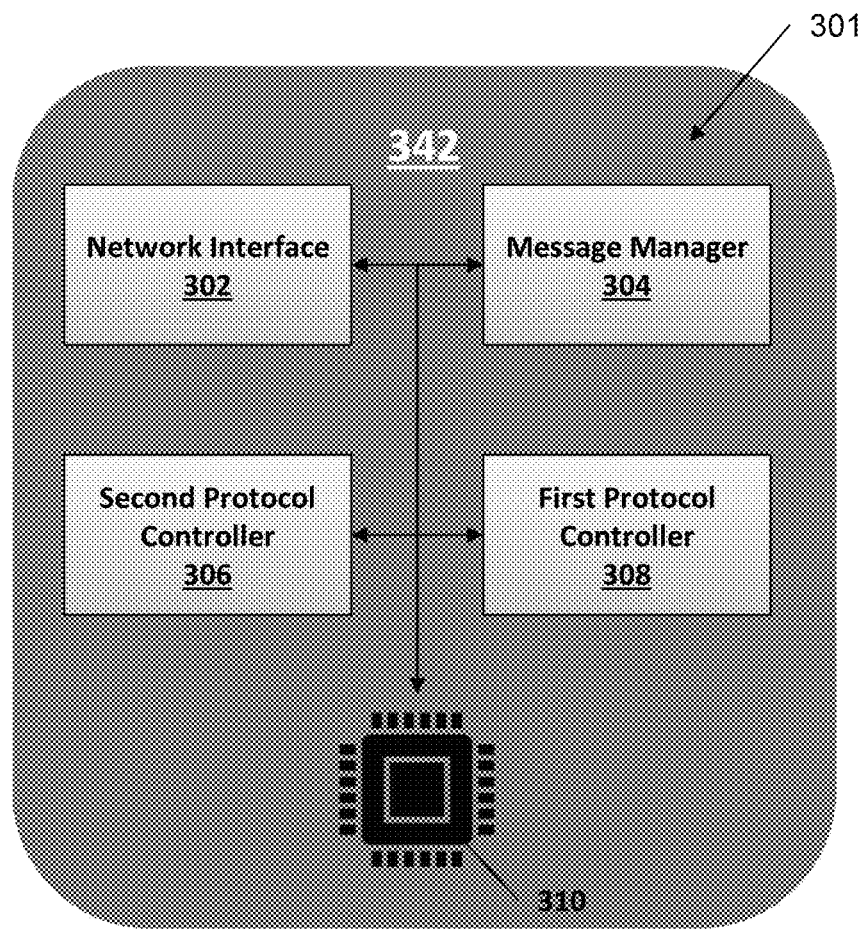
FIG. 3 is a block diagram of a controller in accordance with embodiments of the present disclosure.

Regarding FIG. 3, a network controller 342, substantially like the controller 142 of FIGS. 1-2, can include logic, hardware, and circuitry 301 that perform message protocol tunneling services. For example, the network controller 342 can enable tunneling of communication messages corresponding to a first protocol through a communication channel corresponding to a second protocol.

In embodiments, the network controller 342 can include a network interface 302 that monitors and receives communication messages directed to, e.g., the server 202 of FIG. 2. The network interface 302 can also determine whether a communication message corresponds to a first protocol based on, e.g., the message's network address architecture (e.g., schema). Further, the network interface 302 can determine whether a source business application (e.g., an application 212 of FIG. 2) requires message protocol tunneling services. For example, suppose the network interface 302 determines that a business application 212 requires tunneling services. In that case, the network interface 302 can provide a communication engine (e.g., the engine 210 of FIG. 2) to the application 212 or a user device (e.g., the user device 204 of FIG. 2) running the application 212.

In embodiments, the network interface 302 can determine if an application 212 requires message protocol tunning services using an application data structure stored in a local memory (LM) 310. For example, the application data structure can identify business applications requiring message protocol tunneling services. In other examples, the network interface 302 can determine whether the source business application requires message protocol tunning services based on a request type of a first protocol communication message or read/write (RW) data type corresponding to the first protocol communication message.

Suppose, for example, the first protocol is HTTPS. Then, the request type can correspond to a POST, GET, PUT, PATCH, or DELETE request, amongst other HTTPS request types. Additionally, the RW data type can correspond to static data. Further, the RW data type can correspond to frequently or infrequently changing data. For example, data with frequent changes can correspond to changes greater than a first threshold during a time window. Additionally, data with infrequent changes can correspond to changes less than a second threshold during a time window.

In embodiments, the network controller 342 can include a message manager 304 that analyzes communication messages. Specifically, the message manager 304 can determine whether a communication message corresponds to a second protocol. The message manager 304 can also determine whether the communication message wraps metadata or commands corresponding to a first protocol. Further, the message manager 304 can fire an asynchronous event, including the wrapped first protocol metadata or commands, for further processing, as described below.

In embodiments, the message manager 304 can generate the asynchronous event to correspond to a second protocol communication message. Suppose, for example, the first protocol is HTTPS, and the second is WS. Then, the message manager 304 can fire an asynchronous event, including HTTPS metadata and commands wrapped by a communication message (e.g., the second message) received from the user device 204 of FIG. 2.

In addition, the network controller 342 can include a second protocol controller 306 that receives the asynchronous event from the message manager 304. The second protocol controller 306 can parse the metadata or commands corresponding to the first protocol from the asynchronous event. Further, the second protocol controller 306 can fire a synchronous event with the metadata or commands for processing according to the requirements of the first protocol. Specifically, the second protocol controller 306 can generate the synchronous event to correspond to a first protocol communication message.

In embodiments, the second protocol controller 306 can obtain user-related information corresponding to the user device 204 or source business application 212 corresponding to the asynchronous event's source communication message. Using the user-related information, the second protocol controller 306 can enable the network interface 302 to establish a persistent communication session with the user device 204 using the second protocol.

Suppose, for example, the first protocol is HTTPS, and the second is WS. Then, the second protocol controller 306 can parse HTTPS metadata and commands from the asynchronous event. The second protocol controller 306 can also fire a synchronous event corresponding to an HTTPS message with the parsed HTTPS metadata and commands for further processing, as described below.

In embodiments, the network controller 342 can include a first protocol controller 308 that processes synchronous events fired by the second protocol controller 306. Specifically, the first protocol controller 308 includes logic, circuitry, and hardware that can process the metadata and commands in the synchronous event according to first protocol standards. Once the synchronous event is processed, the first protocol controller 308 can generate response metadata and commands as the first protocol can require. The first protocol controller 308 wraps the response metadata and commands in a second protocol message. Further, the first protocol controller 308 can dispatch the second protocol message to the user device 204 via the network interface 302. In response to receiving the second protocol message, a communication engine (e.g., the engine 210 of FIG. 2) can process the message, as described in greater detail by the description of FIG. 2 above.

Suppose, for example, the first protocol is HTTPS, and the second is WS. Then, using HTTPS metadata and commands in the synchronous event, the first protocol controller 308 can process the event like an HTTPS message. Further, the first protocol controller 308 can dispatch to the user device 204, a second communication message that wraps HTTPS response metadata and commands required by the first protocol.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
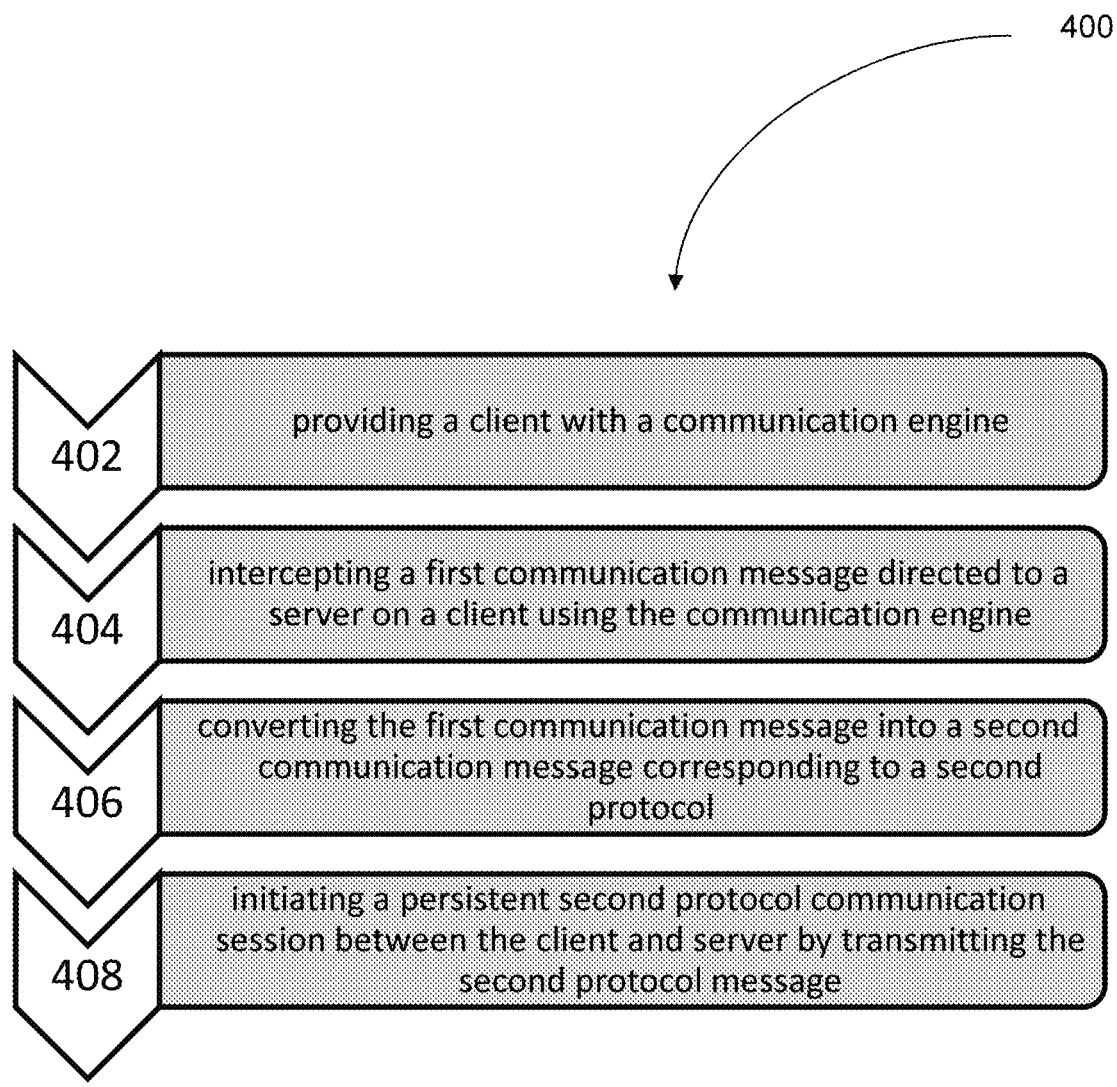
FIG. 4 is a flow diagram of a method for tunneling messages corresponding to a first protocol through a communication channel corresponding to a second protocol per embodiments of the present disclosure.

Regarding FIG. 4, a method 400 relates to tunneling messages corresponding to a first protocol through a communication channel corresponding to a second protocol. In embodiments, the controller 142 of FIG. 1 can perform all or a subset of operations corresponding to method 400.

For example, the method 400, at 402, can include providing a client with a communication engine. Additionally, at 404, the method 400 can include intercepting a first communication message directed to a server on a client using the communication engine. Further, the method 400, at 406, can include converting the first communication message into a second communication message corresponding to a second protocol. Finally, at 408, the method 400 can include initiating a persistent second protocol communication session between the client and server by transmitting the second protocol message.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a backend component can also implement the above-described techniques. The backend component can, for example, be a data server, a middleware component, or an application server. Further, a distributing computing system with a frontend component can implement the above-described techniques. The frontend component can, for example, be a client computer having a graphical user interface, a Web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Edge® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:
1. A method comprising:
    providing a client with a communication engine;

intercepting a first communication message directed to a server on a client using the communication engine, wherein the first communication message corresponds to a first protocol;
converting the first communication message into a second communication message corresponding to a second protocol;
providing the second communication message with first protocol metadata from the first communication message, wherein the first protocol metadata includes one or more of a route, expiration timeout, and one or more first protocol commands;
converting a first protocol network address scheme of the first communication message into a second protocol network address scheme;
extracting the first protocol metadata from the second communication message;
processing the second communication message according to the first protocol using the first protocol metadata on the server;
initiating a persistent second protocol communication session between the client and server by transmitting the second protocol message; and
establishing the persistent second protocol communication session in response to receiving the second communication message on the server.

2. The method of claim 1, wherein the first protocol is a request-response protocol configured for half-duplex and stateless messaging between the client and server.

3. The method of claim 1, wherein the second protocol is a fire-and-forget protocol configured for full-duplex and stateful messaging between the client and server.

4. The method of claim 1, further comprising:
delivering a second protocol response to the client via the persistent second protocol communication session, wherein the second protocol response includes a success or error message required by the first protocol.

5. The method of claim 1, further comprising:
resolving the second protocol response according to at least one request-response requirement of the first protocol using the communication engine.

6. A system with a processor and memory, the system configured to:
provide a client with a communication engine;
intercept a first communication message directed to a server on a client using the communication engine, wherein the first communication message corresponds to a first protocol;
convert the first communication message into a second communication message corresponding to a second protocol;
provide the second communication message with first protocol metadata from the first communication message, wherein the first protocol metadata includes one or more of a route, expiration timeout, and one or more first protocol commands;
convert a first protocol network address scheme of the first communication message into a second protocol network address scheme;
extract the first protocol metadata from the second communication message;
process the second communication message according to the first protocol using the first protocol metadata on the server;
initiate a persistent second protocol communication session between the client and server by transmitting the second protocol message; and
establish the persistent second protocol communication session in response to receiving the second communication message on the server.

7. The system of claim 6, wherein the first protocol is a request-response protocol configured for half-duplex and stateless messaging between the client and server.

8. The system of claim 6, wherein the second protocol is a fire-and-forget protocol configured for full-duplex and stateful messaging between the client and server.

9. The system of claim 6, further configured to:
deliver a second protocol response to the client via the persistent second protocol communication session, wherein the second protocol response includes a success or error message required by the first protocol.

10. The system of claim 6, further configured to:
resolve the second protocol response according to at least one request-response requirement of the first protocol using the communication engine.

* * * * *